May 24, 1938.　　A. J. CAWLEY　　2,118,160
TELEVISION PROCESS AND APPARATUS
Original Filed June 3, 1930　　2 Sheets-Sheet 1
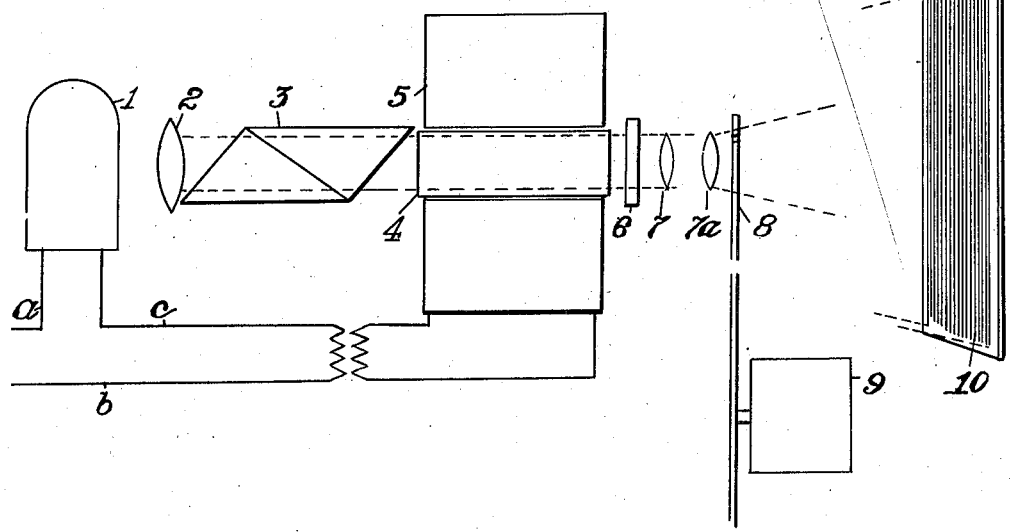
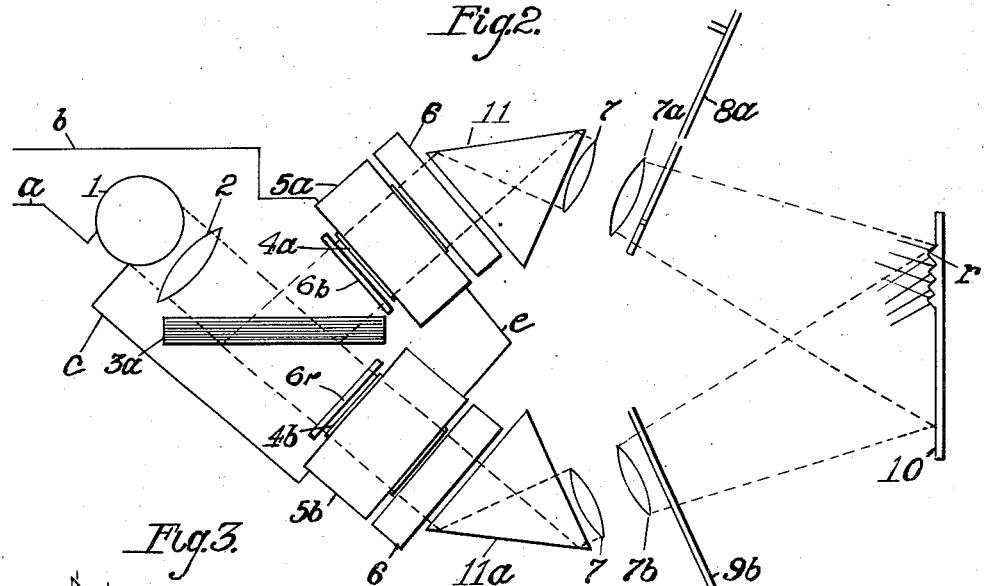
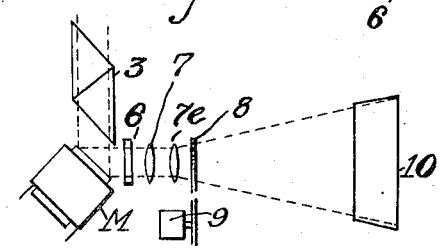
INVENTOR
Aloysius J. Cawley

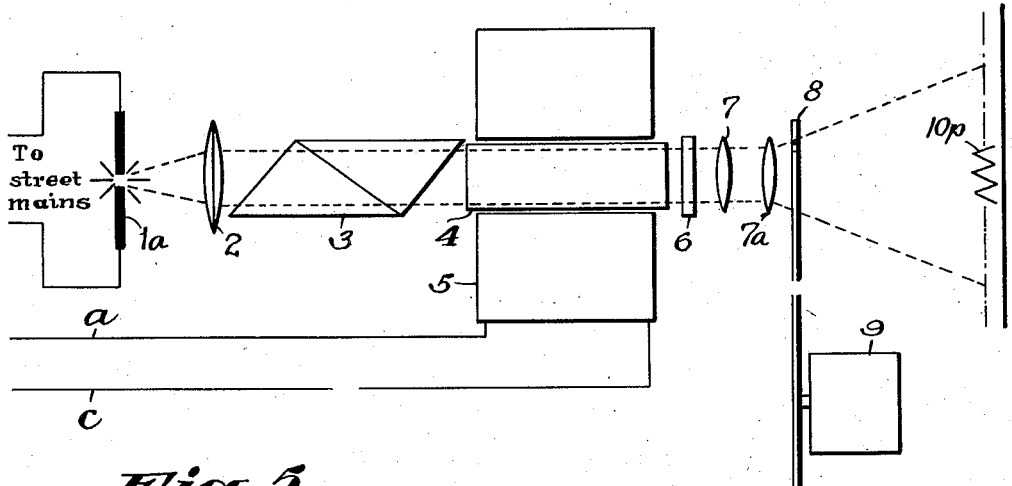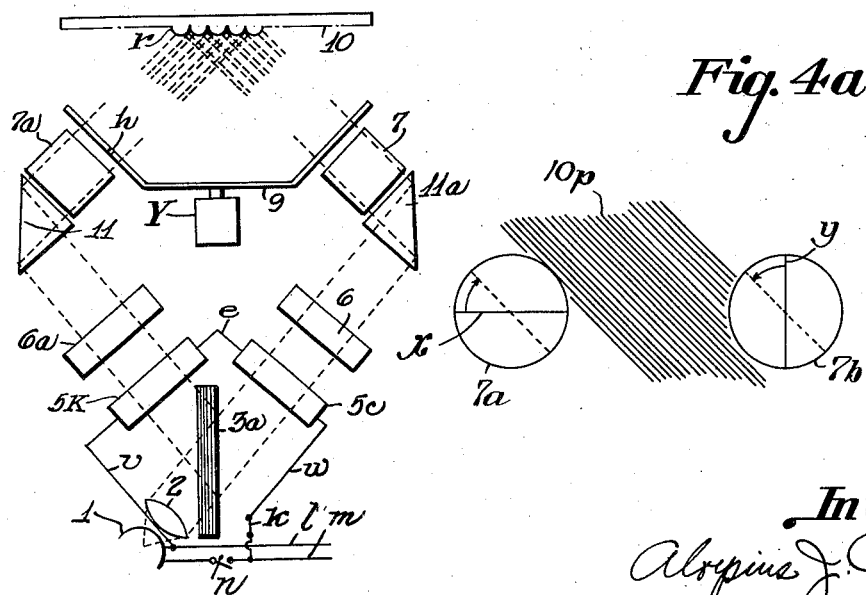

Patented May 24, 1938

2,118,160

UNITED STATES PATENT OFFICE 2,118,160

TELEVISION PROCESS AND APPARATUS

Aloysius J. Cawley, Pittston, Pa.

Original application June 3, 1930, Serial No. 459,368. Divided and this application October 25, 1935, Serial No. 47,483

13 Claims. (Cl. 178—5.4)

The invention relates generally to the electrical transmission of optical images from one place to another by means of wire or wireless communication. More particularly it is concerned with the variation of the intensity of light in a television receiver in accordance with an image by means of the electromagnetic rotation of the plane of polarization of such light, while the image area is scanned by any of the well known methods.

An object of the invention is to combine the ordinary method of varying the intensity of a light source with the variation in light intensity produced by electromagnetic or electrostatic rotation of the plane of polarization, thus bringing about a much more brilliant and detailed picture.

The light is plane polarized and then passed through an electromagnetic or electrostatic rotating means and later through an analyzing means, the latter being so adjusted as to approximately extinguish the light. However, the operation is not limited to this action. The image-varied television current traversing the rotating means causes varying amounts of light to pass in accordance with the image being transmitted.

A special projection screen is described possessing a light polarizing surface, as is also its method of manufacture. This polarizing surface may be substituted for the analyzing means.

A method of projecting with polarized light is also described which utilizes both polarized components in such manner as to produce colored, daylight and stereoscopic projection.

An object is the resolving of a light beam from a light source into two beams of plane polarized light whose planes of polarization differ from each other by angles of 90°, and the rotation of the planes of polarization of both of those beams by means of Kerr cells or their equivalents in accordance with an image current, and the superposed projection of those images upon a screen, the projection being either alternate or simultaneous.

Reference is to be had to the accompanying drawings forming a part of this specification, in which similar reference characters have like meanings in all of the views, and in which, Figure 1 is an elevational view showing the method of projecting a television image upon a screen and employing electromagnetic rotation of the plane of polarization therein.

Figure 1a illustrates a modification of the invention illustrated in Figure 1.

Figure 2 is a plan view of a method of projecting colored, daylight and stereoscopic pictures and also employing the principle of the electromagnetic rotation of the plane of polarization of light.

Figure 3 is a plan view of a method of producing television pictures utilizing the rotation of the plane of polarization of light by causing its reflection from the pole of an electromagnet which is traversed by an image-varied current.

Figure 4 is a view of the polarizing screen and projecting means.

Fig. 4a shows a view of the relation between the polarized light beam and the screen.

Figure 5 is a plan view of a television projection apparatus for producing stereoscopic, colored images.

In Figure 1, a light source 1 is illustrated which may be an arc light, incandescent light or lamp, or glow lamp, but is here shown as a neon lamp, which as is well known, possesses the property of varying its intensity many thousands of times per second. The lamp is shown as connected in the usual manner in a television receiver, wires a and b communicating with the receiving, amplifying circuits. The light, however, may be an ordinary arc lamp 1a of Figure 1a, as used in projectors, and may be lighted by an independent source of current, such as the street mains. The optical system 2 acts to condense the light into a beam of parallel rays of light. This beam of light passes through any desired form of means for plane polarizing light, and a Nikol prism, which is well known to those skilled in the art, is illustrated at 3. The light from source 1 is therefore, plane-polarized by prism 3 and in such plane that it is more or less extinguished by the analyzer 6 which it later in its course traverses. The light beam passes from prism 3 through the cylinder 4, which may be made of any special form of glass, such as silicated borate of lead, which is best adapted for demonstration of the Faraday effect, which is the rotation of the plane of polarization. Or, 4 may be a transparent tube of any liquid, even water, or carbon bisulphide, or any gas such as oxygen which is suitable for the demonstration of the Faraday effect. Surrounding tube 4 is a solenoid 5 which is traversed by the image-varied current, and which causes the solenoid to rotate the plane of polarization of the light beam to varying degrees. Optical elements 7 and 7a represent lenses which project the image upon the screen 10, which may or may not be provided with a polarizing surface as hereinafter described. The light passes through the spiral line of openings in scanning disk 8, which is shown as being rotated in synchronism with a similar disc at the sending station by motor 9. The mechanism of scanning an image by means of a disc having a spiral line of holes need not be described, as it is familiar to those skilled in the art of television. The light from source 1 is plane polarized by passing it through the polarizing means 3 and setting the analyzer 6 to practically extinguish the light in the well known manner. The image-fluctuated current passing through the solenoid 5, causes the plane of polarization to be rotated to varying degrees causing more or less light to be passed by the analyzer 6, resulting in a variation in the intensity of the light. This variation is synchronous with the variation in light intensity of the image at the transmitting station. This variation in light intensity combined with the scanning produced by the disk 8 results in a reproduction of the transmitted image upon the screen 10.

If a neon lamp is used as the source 1 and if it is supplied with the image-varied current, the intensity of its light will be varied in accordance with the image being transmitted. We therefore, have two means of varying the light intensity acting in synchronism for the production of a television image, namely, the neon lamp and the electromagnetic rotation means for rotating the plane of polarization. A much more contrasted and detailed picture can, therefore, be produced than with the former alone, as now used in practice.

The current is shown passing from the amplifying means of the receiver to wire $a$ to lamp $l$, to wire $c$ to transformer $t$ and returning by wire $b$. The solenoid 5 is placed in the secondary circuit of the transformer. The transformer may be omitted and the solenoid 5 connected directly to the receiving circuit. The lamp 1, particularly if an arc lamp, such as 1a of Figure 1a, may be illuminated by an entirely independent source of electric current, as stated above, such as the street lighting mains. If the current traversing the circuit $a$, $b$, $c$ is pulsating direct current, then, due to the action of the transformer $t$, when the current increases, the current in the solenoid will pass in one direction, while it will pass in the opposite direction when the current in circuit $a$, $b$, $c$, decreases. Current passing in one direction through the solenoid will rotate the plane of polarization in one direction, and will rotate it in the opposite direction if the current changes its direction. This would give a very sensitive apparatus. A direct current traversing the solenoid 5 and never varying its direction, but simply varying its intensity, will cause the rotation to take place in one direction only. The use of a neon lamp varying its intensity of light in synchronism with the variations produced by the solenoid is very desirable for home projection of television images.

In my application for Letters Patent, Serial No. 439,286, filed January 2, 1921, for Daylight colored projection systems, I described a means for obtaining daylight pictures by means of polarized light and this application describes means which are to coact with the apparatus described therein. The screen 10 may be an ordinary projection screen, or it may be a polarizing type of screen as described in the above mentioned application, as shown at the top of Figure 1a. If a screen 10 is employed possessing a polarizing surface, it may be set at a certain position so as to extinguish the plane polarized, unrotated light beam, and analyzer 6 may be in that case, dispensed with. This is illustrated in Figure 4.

A polarizing screen as described in the above mentioned application may be made by rubbing in the same direction the surface of a sheet of plate glass or other transparent medium with emery of a certain size of particles.

Figure 2 represents a projection system intended to utilize both components of the polarized light. Current passes from the usual television receiving means to the lamp 1, which may be of neon, by means of wire $a$, and thence by wire $c$ to solenoid 5b, by wire $e$ to solenoid 5a and by wire $b$ back to the receiver circuit. The optical system 2 produces a parallel beam of light rays which impinges upon the polarizing means 3a at the polarizing angle. This polarizing means 3a is shown as a bundle of thin glass plates, which as is well known, possesses the power of polarizing light. Approximately one half of the light incident upon 3a is refracted and passes on to the glass cylinder 4b, while approximately the other half is reflected and passes on to glass cylinder 4a. The beam is thus resolved into two component beams, and each of the component beams is composed of plane polarized light. The planes of polarization of the two beams differ by an angle of 90°, as is well known. The reflected beam passes through the glass or other cylinder 4a and thence to the totally reflecting prism 11, which changes the course of the beam and directs it upon the screen 10. The optical elements 7 and 7a project the light upon a large area of the screen 10. The refracted beam passes through cylinder 4b, through analyzer 6, through total reflecting prism 11a, to optical elements 7 and 7b and is projected superposed upon the screen 10. The analyzers 6 are to be used to more or less extinguish the polarized beams both reflected and refracted, if the screen has no polarizing surface. The reflected beam is scanned by scanning disc 8a and the refracted beam is scanned by the disc 9b. They may be scanned in absolute synchronism. However, in the drawings, they are shown as scanning lines alternately in the two beams, as indicated by the fact that a scanning hole $h$ of disk 8a is shown scanning the reflected beam, while no scanning hole is shown in disk 9b in the refracted beam. In the next instant, a scanning hole in disk 9b will scan the refracted beam, while none scans the reflected beam. In such case, a color screen 6b, such as orange-red may be placed in the path of the reflected beam and a blue-violet screen 6r, in the path of the refracted beam, and colored pictures projected, as two distinct transmissions are possible. If suitable ridges such as $r$ are provided (and if a similar arrangement is given to the lenses taking the picture at the transmitting station) it will be seen that the reflected beam illuminates but one face of each of the ridges, while the refracted beam illuminates but the other of each ridge. This will give a method of producing stereoscopic pictures, which together with the use of color screens may be both stereoscopic and colored. They may also possess a daylight property. However, if a polarizing surface is given to screen 10, as indicated at the top of Figure 1a, daylight pictures will be obtained, through the action of the polarized light in accordance with the method described in the above application.

In the operation of the system, if the screen 10 has no polarizing surface, the image-varied current traversing the electromagnetic rotators 5a and 5b cause a rotation of the plane of polarization of both the reflected and the refracted beams of light. The refracted beam, before it reaches 4b, is polarized in a plane vertical to that of the paper, while the reflected beam, before it reaches 4a, is polarized in a plane parallel to the surface of the paper. The two analyzers 6 are set differently in order that each might extinguish the light of its particular beam. Solenoids 5a and 5b are so placed and connected that they rotate the planes of polarization of the two beams to overcome the extinguishment produced by analyzers 6. The analyzers 6 may be Nikol prisms, plates of quartz, or any other means used heretofore as an analyzer. In this apparatus, an arc lamp may be used if desired, or any other source of illumination desired. The discs, as before mentioned, may be operated to scan in synchronism or alternately, as desired. The wiring of the apparatus is not limited to that shown, as many other circuit arrangements may be used.

If the screen 10 is provided with a polarizing surface, it should be set so that it will reflect light polarized midway between the two planes of polarization of the reflected and refracted beams of light. This is illustrated in Figure 4, where the polarizing surface 10p is shown midway between the planes of polarization x and y of the two light beams passing through the lenses 7a and 7b, also illustrated in Figure 2. The dotted lines indicate the position to which the planes of polarization of the beams are rotated to correspond with that of the polarizing ridges 10p.

Figure 3 is another modification of the main invention, which is the magnetic rotation of the plane of polarization. Here, however, the polarized light is rotated by reflection from the polished pole of an electromagnet. The light passes through the polarizer, which is here shown as a Nikol prism 3. It is reflected from the surface of the magnet M. This electromagnet is provided with an image-varied television current in the well known manner. The analyzer is set to extinguish the polarized light when the current traversing the magnet M corresponds to a shaded portion of the image. The analyzer is shown at 6. As the current increases in value, the plane of polarization is rotated beyond the extinguishing position to a degree depending upon the intensity of the current, and light traverses the analyzer 6 correspondingly. The optical element 7e projects light upon the screen 10. The scanning disc 8 scans the image field in the usual manner.

Figure 5 illustrates an apparatus also adapted to the stereoscopic projection of television images. Light from lamp I, which is here represented as being a crater neon lamp, but which may be an arc lamp or another light source, is formed into a parallel beam by means of lens 2. A crater neon lamp or other point source of light readily lends itself to the production of a parallel beam of light. This beam impinges upon the polarizer, which is here shown as a bundle of sheets of thin plate glass 3a, which is very inexpensive. The beam of light, according to well known principles, is resolved into two component beams of plane polarized light whose planes of polarization differ by an angle of 90°. Each of those component beams pass through a Kerr cell or a Karolus cell 5K and 5C. The analyzers 6 and 6a are so set as to just extinguish the light beams when no current is traversing the cells. As the amplified television current traverses the cells 5K and 5C, the planes of polarization of the respective beams are rotated more or less in accordance with the variation in intensity of the television current, and more or less of the light is permitted to pass by the analyzer in accordance with the rotation of the planes beyond the point of extinguishment.

The amplified television current comes in over the wires l and m and is sent through the wires v to cell 5K and wire e to cell 5C, to wire w, to switch k and to wire m. In such case, the light source I consists of an independent source of illumination, such as an arc light connected to the street mains. However, a crater neon lamp may be used as I, in which case the switch n is closed and then the image current passes through the neon lamp directly and is shunted around the two cells which may be placed in series or in parallel in this shunt. It is to be noted that the neon lamp depends upon amperage for its operation while the action of the Kerr cell is mostly electrostatic, i. e., it depends particularly upon voltage. In fact such cells may be made by placing an electrical condenser in a suitable fluid such as nitrobenzole. This combination of the cell and lamp, one utilizing the amperage effect while the other utilizes the electrostatic or voltage effect, constitutes a very desirable cooperation of elements that is decidedly novel. One does not rob the other of any desirable form of energy.

The two beams of light after traversing the Kerr cells and analyzers encounter the prisms 11 and 11a, and the latter act to reflect the beams upon the screen 10, which is here shown as provided with round ridges r. Thus the two images formed by the beams are projected in superposition upon the screen 10. It is to be noted that the elements 5K, 6a and 11 should be shown much closer together, while the distance of the screen 10 from the rest of the apparatus should be much greater than that shown. This combination possesses the very great advantage that all of the available light is used and that one component is not wasted, as is done in ordinary television apparatus in which polarized light is used. A similar arrangement is used at the transmitter, in which a photoelectric cell is substituted for the neon lamp I. Thus stereoscopic images may be produced, as the scanning element 9, operated by motor Y, is equipped with a series of holes h or lenses arranged in image exploring relation in such manner that a line in each image is scanned alternately. This is due to the fact that the scanning holes h are placed approximately a distance apart that is equal to two image dimensions. Thus images corresponding to those produced by the right and left eyes are obtained. The right eye image is projected upon the right sides of the ridges r and the left eye images are projected upon the left sides of the ridges r alternately. If the screen 10 and ridges r are made transparent, a stereoscopic image may be seen on the opposite side of the screen, also.

Suitable colored screens may be interposed in the beams at the transmitting and receiving stations and color effects may be thus added to the stereoscopic effects. Thus colored stereoscopic images may be produced that will consist of approximately twice the amount of light that is used in any television system using polarized light valves, such as the Kerr or the Karolus valves. If a crater neon lamp is used as the source I, twice the definition obtainable otherwise is secured, as it may also have its intensity varied in accordance with the current. Those are very great advantages. It is to be noted that the ridges serve to give a certain degree of daylight effect.

This application is a continuation-in-part of my application Serial No. 459,368 of June 3, 1930 for Televisio nprocess and a continuation-in-part of application Serial No. 627,176, filed July 30, 1932, for Stereoscopic projection apparatus.

Having described my invention, I claim as new and desire to secure by Letters Patent:

1. In combination: a light source, means for producing a beam of parallel rays from said light source, polarizing means for converting said beam into two beams of plane polarized light having their light polarizing planes at different angles and said beams having different directions, means for extinguishing the said beams at certain positions of their polarizing planes, electromagnetic means coacting with each of said beams to rotate their planes to various positions beyond the points of extinguishment when traversed by an image-varied current, a screen, means for superposedly projecting said beams upon said screen, means for consecutively permitting the passage of said light to consecutive areas of said screen to reproduce a television image.

2. The process of producing colored television images which consists in superposedly projecting two component beams of light upon a definite plane from a single light source, limiting the light of each of said beams to a definite elementary color, alternately scanning said beams and simultaneously varying the intensity of said light source and of said light constituting said beams.

3. In combination: a light source, means for producing a beam of parallel rays from said light source, polarizing means converting said beam into two beams of plane polarized light having their light polarization planes at different angles and said beams having different directions, a projection screen provided with analyzing means, electromagnetic means coacting with each of said beams to rotate their planes to various positions beyond the points of extinguishment when traversed by an image-varied current, means for consecutively permitting the passage of said light to consecutive areas of said screen to produce a composite image.

4. A television apparatus consisting of a light source, means for producing a beam of parallel rays from said light source, polarizing means converting the light of said beam into two beams of plane polarized light having their planes of polarization at different angles and said beams having different directions, means for extinguishing the light of each of said beams at certain positions of their polarizing planes, a color filter in the path of each of said beams, electromagnetic means coacting with each of said beams to rotate their planes to various positions beyond the points of extinguishment when traversed by an image-varied current, a screen, means for superposedly projecting said beams upon said screen and means for consecutively permitting the passage of said light to consecutive areas of said screen to produce a colored television image.

5. A television apparatus consisting of an image-varied light source, means for producing a beam of parallel rays from said light source, a polarizing means converting said beam into two beams of plane polarized light having their planes of polarization at different angles and said beams having different directions, means for extinguishing the light of said beams at certain positions of their polarizing planes, electromagnetic means coacting with each of said beams to rotate their planes to various positions beyond the points of extinguishment when traversed by an image-varied current, a screen, means for superposedly projecting said beams upon said screen, means for consecutively permitting the passage of said light to consecutive areas of said screen to reproduce a television image.

6. A stereoscopic television apparatus consisting of a light source, means for producing a beam of parallel rays from said light source, polarizing means converting said beam into two beams of plane polarized light having different directions and having their planes of polarization at different angles, means for extinguishing said beams at certain positions of their polarizing planes, electromagnetic means coacting with each of said beams to rotate their planes to various positions beyond the points of extinguishment when traversed by an image-varied current, a projection screen, a ridged surface on said screen, means for projecting each of said beams upon each side of said ridges, means for consecutively permitting the passage of said light to consecutive areas of said screen.

7. In a modulated polarized light system, means for increasing the light efficiency thereof, comprising a source of light, a polarizer in which the light from said source is polarized in a reflected beam, and a transmitted beam, means for modulating said beams, and means for recombining the polarized beams.

8. In a modulated polarized light system, means for increasing the light efficiency thereof, comprising a source of light, a polarizer in which the light from said source is polarized in a reflected beam, and a transmitted beam, magnetic means responsive to varying signals for separately rotating said beams, and means for recombining the polarized beams.

9. In a modulated polarized light system, means for increasing the light efficiency thereof, comprising a source of light, a polarizer in which the light from said source is polarized in a reflected beam, and a transmitted beam, magnetic means responsive to varying signals for separately rotating said beams, and means for recombining the polarized beams, and magnetic means comprising coils responsive to said varying signals, and poles therefore having reflecting means from which the polarized beams are reflected.

10. The process of producing television images consisting of forming a beam of plane polarized light from a light source, applying an image varied current to said light source, and simultaneously causing said current to rotate the plane of polarization of said beam to varying degrees and successively exploring the successive elemental areas of said light beam in order to produce an image by synchronously varying the intensity of said source and rotating the plane of polarization of said light beam.

11. In combination: a variable intensity light source traversed by an image varied current, means for producing a parallel beam of plane polarized light from said light source, an analyzer acting to extinguish said beam at a certain position, a light valve also traversed by said image varied current and acting to rotate the plane of polarization of said beam to various degrees and means for successively exploring the successive elemental areas of said light to produce a television image by the synchronous variation of the intensity of said light source and the rotation of said plane.

12. In combination: a variable intensity light source traversed by an image varied current, means for producing a parallel beam of plane polarized light from said light source, an analyzer acting to extinguish said beam at a certain position, a light valve also traversed by said image varied current and acting to rotate the plane of polarization of said beam to various degrees, means for projecting the light of said beam upon a screen and means for successively exploring the elemental areas of said projected light to produce a television image by the synchronous variation of the intensity of said light source and the rotation of said plane.

13. In combination: a variable intensity light source traversed by an image varied current, means for producing a parallel beam of plane polarized light from said light source, means for projecting the light of said beam upon a projecting screen, a polarizing screen provided with a polarizing surface and acting to extinguish said light at certain positions of its plane of polarization, a light valve traversed by said image varied current and acting to rotate said plane of polarization to various degrees in accordance with said current and means for successively exploring the elemental areas of said projected light to produce a television image by the synchronous variation of the intensity of the light of said source and the rotation of said plane.

ALOYSIUS J. CAWLEY.